Figure 1:
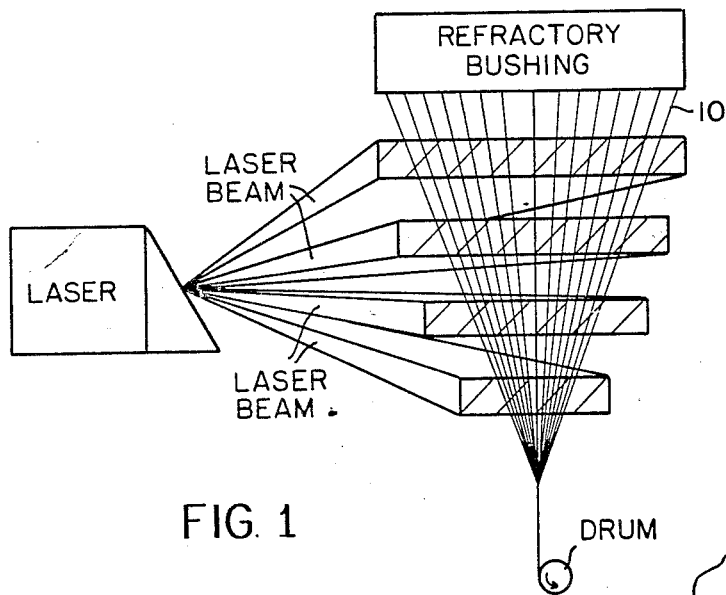

United States Patent [19]

Rittler

[11] 4,201,559
[45] May 6, 1980

[54] METHOD OF PRODUCING A GLASS-CERAMIC

[75] Inventor: Hermann L. Rittler, Corning, N.Y.

[73] Assignee: Corning Glass Works, Corning, N.Y.

[21] Appl. No.: 945,506

[22] Filed: Sep. 25, 1978

[51] Int. Cl.² .............. C03B 37/00; C03B 32/00; C08L 91/00
[52] U.S. Cl. .............. 65/2; 65/33; 106/50; 106/52; 106/39.6; 106/39.8; 106/99
[58] Field of Search .............. 65/33, 30R, 114, 111, 65/2, 12; 106/39.7, 39.8, 39.6, 52, 50

[56] References Cited

U.S. PATENT DOCUMENTS

| | | | |
|---|---|---|---|
| 3,454,386 | 7/1969 | Ernsberger | 65/33 |
| 3,464,807 | 9/1969 | Pressau | 65/33 |
| 3,589,878 | 6/1971 | Achener | 65/33 X |
| 3,615,317 | 10/1971 | Jagodzinski et al. | 65/33 X |
| 3,799,836 | 3/1974 | Rogers et al. | 65/33 X |
| 3,881,945 | 5/1975 | Trojer et al. | 65/33 X |
| 3,900,306 | 8/1975 | Brueggemann et al. | 65/33 |
| 3,931,438 | 1/1976 | Beal et al. | 65/33 X |
| 4,069,031 | 1/1978 | Rapp | 65/33 |

*Primary Examiner*—S. Leon Bashore
*Assistant Examiner*—F. W. Miga
*Attorney, Agent, or Firm*—Clinton S. Janes, Jr.

[57] ABSTRACT

There is disclosed a method of converting a thin glass body, such as a glass fiber or coating, to a corresponding glass-ceramic body by a heat treatment comprising a plurality of heating-cooling cycles.

7 Claims, 3 Drawing Figures

METHOD OF PRODUCING A GLASS-CERAMIC

BACKGROUND OF THE INVENTION

A glass-ceramic body is composed of a myriad of fine-grained crystals of relatively uniform size which are randomly oriented and homogeneously dispersed in a glassy matrix. The crystals comprise the major portion of the body. Such bodies are produced from a corresponding glass body by heat treating the glass body to cause controlled crystallization.

The basic character of glass-ceramics, and their production by thermally induced nucleation and crystallization, are described in detail in U.S. Pat. No. 2,920,971, granted Jan. 8, 1960 to S. D. Stookey, and reference is made thereto for further discussion. The patent explains that the first step is to melt a glass-forming batch, usually including a crystallization catalyst or nucleating agent. The melt is then simultaneously cooled and a glass article of desired configuration shaped therefrom. This glass shape is thereafter heat treated to initially form nuclei which subsequently act as sites for the growth of crystals thereon as the temperature is raised and the heat treatment continued. Since crystallization occurs at the innumerable nuclei formed throughout the glass, the resulting crystals are, perforce, large in number, uniformly dispersed in the body, and fine-grained.

Glass-ceramic articles are highly crystalline, the crystal phase usually constituting over 50% by weight of the body, and frequently over 75%. Hence, the physical and chemical properties of the glass-ceramic body generally approximate those of the crystal phase or phases present rather than the original glass. The crystal phases developed are dependent upon the composition of the original glass and the heat treatment applied thereto. Thus, it is often possible to cause the crystallization of one particular phase at a low temperature and a different or additional phase at higher temperatures. Inasmuch as the crystallization occurs in situ, glass-ceramic bodies are free of voids and non-porous.

In the customary commercial manufacture of glass-ceramic articles, a glass-forming batch is melted; the melt is cooled to at least within, and normally below, the transformation range to form a glass body; and the glass body is then reheated to cause crystallization in situ. This heat treatment conventionally comprises two steps. First, the glass body is heated to a temperature within or somewhat above the transformation range to cause the development of nuclei in the glass. This process commonly requires about 1-6 hours. Subsequently, the nucleated body is heated to a higher temperature, frequently above the softening point of the glass, to effect the growth of crystals on the nuclei. This step normally involves about 1-8 hours.

The time required to carry out this customary commercial practice, while seemingly quite long, has generally been considered necessary to insure production of uniformly crystalline bodies exhibiting little dimensional change during the conversion from glass to glass-ceramic. It is obvious that such lengthy processing is rather expensive at best, and that such extended times are completely incompatible with certain products and processes.

For example, it is recognized that glass-ceramic fibers could be very useful, especially for such purposes as concrete reinforcement, but lengthy processing times are incompatible with normal fiber drawing processes. It has also been recognized that glass-ceramic coatings on either glass or metal filaments or strands can provide highly advantageous properties, but again it would be highly desirable to conduct one continuous processing operation. Such uses for glass-ceramic materials, and the advantages thereby attained, are described in greater detail in my copending applications Ser. Nos. 945,508 and 945,507, filed of even date herewith and entitled "Optical Waveguides" and "Basalt Glass-Ceramic Fibers and Method of Production."

As explained and illustrated in greater detail in the companion applications mentioned above, and in the literature cited therein, a commonly used method of continuous fiber or filament production involves drawing the fiber or filament continuously from a container of molten glass. Also, elongated glass and metal filaments or strands may be coated by drawing the elongated article through a bath of glass. In any case, it is readily apparent that the operation would be greatly simplified if the glass fiber, or coated filament, could be immediately exposed to a short heat treatment that would effect conversion to a glass-ceramic state as part of the drawing operation. Each of the companion applications discloses such an expeditious method.

A very important characteristic of any glass-ceramic material is the uniformly fine-grained nature of its crystalline phase, a property generally attributed to nucleated crystallization. In general, the strength of a glass-ceramic material, as measured by its modulus of rupture, is greater than that of the precursor glass. This is generally attributed to the nature of the crystal phase. In contrast, the well-known phenomenon of devitrification in glass, wherein spontaneous crystal growth occurs from the surface of a body into the interior, produces large, oriented, non-homogeneous crystals which result in a brittle material of relatively little strength.

A very fine grain size is especially important in resilient articles and coatings where at least one dimension is very small. The crystal size must of course be much smaller, else the article loses its resiliency, behaves physically like a true ceramic, and is very susceptible to physical damage.

PURPOSE OF THE INVENTION

It is a basic purpose of the present invention to provide an improved method of converting a glass body to the glass-ceramic state by heat treatment. Another purpose is to provide a method of producing glass-ceramic bodies where at least one dimension of the article is less than 250 microns. A further purpose is to provide a means of producing such a body having a fine-grain crystal phase whereby the body is highly resilient. Another purpose is to provide a method of converting a glass to a glass-ceramic material which can be integrated into a conventional drawing operation. A still further purpose is to provide a simple, inexpensive method of producing fine-grain glass-ceramic materials, especially elongated thin articles such as fibers, filaments (mono- or laminated), ribbons, microsheet and coatings on such bodies as glass, metal, or ceramic cores or substrates.

SUMMARY OF THE INVENTION

My invention is a method of converting a glass body, having at least one dimension not greater than 250 microns, to a glass-ceramic body having a fine-grained polycrystalline phase by a heat treatment that internally develops the polycrystalline phase, the heat treatment consisting of a plurality of heating and cooling cycles. Each cycle may consist of heating the body into the range of temperatures at which crystallization occurs and then cooling the body below that temperature. Preferably, the cycles are equal in time and the total duration is not over about ten minutes.

PRIOR ART

The production of glass-ceramic fibers by heat treatment of glass fibers is disclosed for example in U.S. Pat. Nos. 3,881,945; 3,929,497; and 4,008,094. Rapid ceramming methods, which presumably could be applied to thin bodies as well as thick, are reviewed in U.S. Pat. No. 4,042,362 granted Aug. 16, 1977 to J. F. MacDowell et al.

U.S. Pat. No. Re. 27,560, granted Jan. 23, 1973 to C. Achener, discloses devitrifying the core of a coaxial fiber, while the ceramming (crystallizing) of a glass coating on metal wire is described in United Kingdom Pat. No. 1,174,474 and U.S. Pat. Nos. 3,389,458 and 3,464,836.

U.S. Pat. No. 1,889,067, granted Nov. 29, 1932 to H. P. Hood, discloses a technique for restoration of transmission in ultraviolet glasses by exposing the glass to a heat treatment in the neighborhood of its annealing temperature. The patent discloses a test procedure in which the ultraviolet transmitting glass was repeatedly darkened by exposure to radiation and then restored by heat treatment. U.S. Pat. No. 3,881,902, granted May 6, 1975 to R. D. DeLuca, discloses an optical waveguide containing titania as a doping oxide, and describes heat treating the waveguide at a temperature in the range of 500°–1000° C. to oxidize the titanium ion and thus improve optical transmission.

U.S. Pat. No. 3,453,097, granted July 1, 1969 to W. Hafner, discloses separating a glass sheet along a desired line of severance by moving the sheet continuously past a continuous laser beam focused on the desired line of severance. U.S. Pat. No. 3,839,005, granted Oct. 1, 1974 to R. W. Meyer, describes severing a rotating article with a laser beam, the rotation causing the laser beam to repeatedly trace a circumferential pattern about the glass article coincident with the desired line of severance. United Kingdom Pat. No. 1,484,724, granted to James A. Jobling and Company Ltd., discloses a method of cutting tubing that uses a laser beam. By splitting the beam into several parts, and also using mirrors to focus the beam on different tube supports, up to a dozen cuts can be made simultaneously and the operation repeated continuously to provide up to a few thousand cuts per hour.

U.S. Pat. No. 3,792,989, granted Feb. 19, 1974 to J. R. Dahlberg et al., discloses a method of severing glass by thermally scoring the glass along an intended line of cut with an in-line array of hot gas heaters aligned along the line of cut. U.S. Pat. No. 3,935,419, granted Jan. 27, 1976 to E. Lambert et al., discloses a method of severing a body of vitreous or vitro-crystalline material by irradiating the body with one or more laser beams. It suggests that, if the beam source and/or the glass be continuously moved, a pulsed beam can be employed.

THE DRAWING

Figure 2:
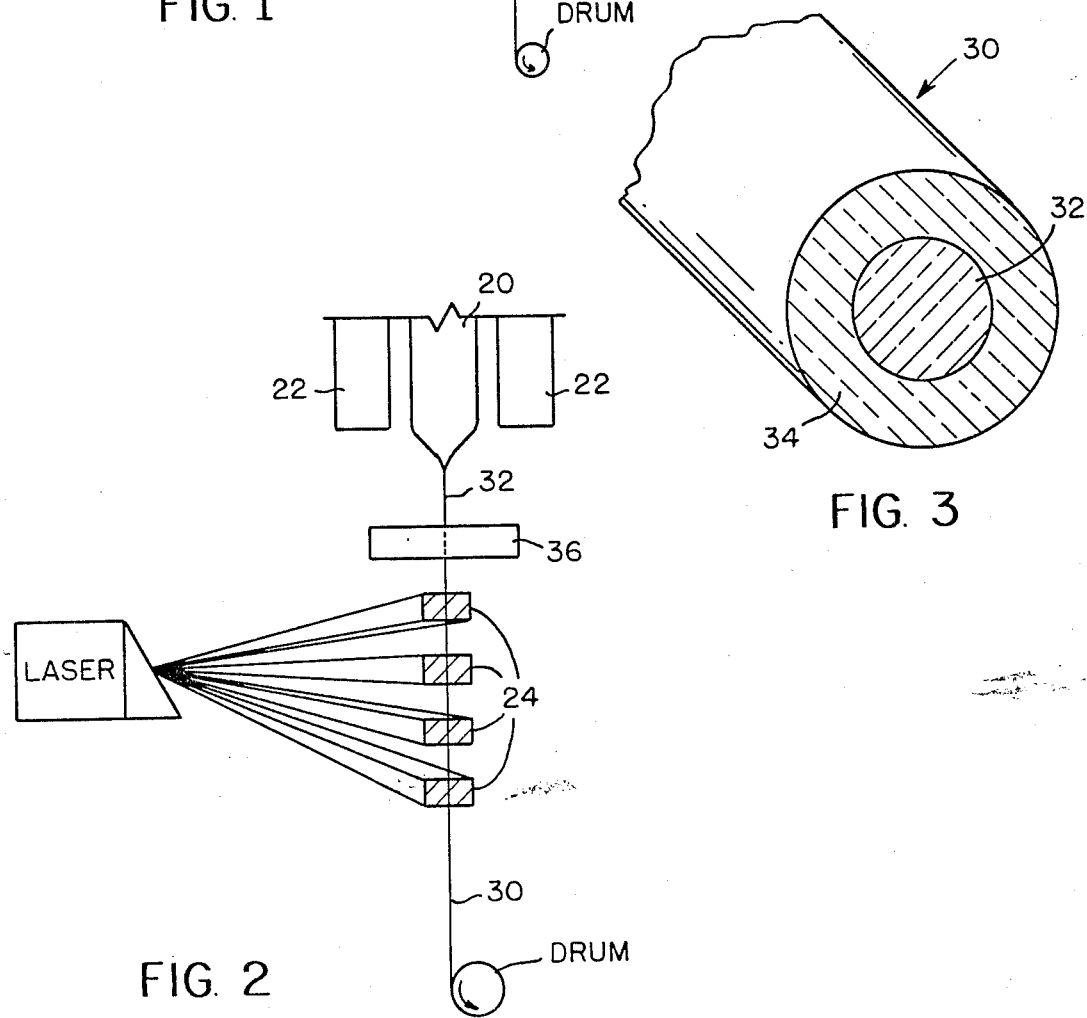
Figure 3:
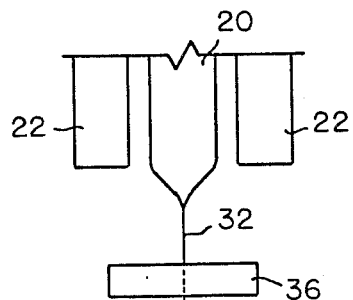

The invention is hereafter described with reference to the attached drawing wherein, FIG. 1 is a schematic illustration, with the apparatus partly in section, of the invention applied to fiber production, FIG. 2 is a schematic illustration, with the apparatus partly in section, of the invention as applied to optical waveguide production, and FIG. 3 is an enlarged end view, in perspective, of the product of FIG. 2.

GENERAL DESCRIPTION

The present invention provides a simple, convenient, and highly effective procedure for ceramming certain glass bodies, that is, converting such glass bodies to corresponding glass-ceramic bodies by thermally induced internal nucleation and crystallization. It is not limited to specific glasses, except as the glass must be amenable to the nucleated crystallization that is characteristic of the ceramming process. It is, however, limited to cerammable glass bodies having at least one dimension less than about 250 microns. This includes, but is not limited to, such shapes as fibers, filaments (both single and laminated), ribbons, microsheets, and coatings on such articles as glass, metal or ceramic cores or substrates.

The characteristic feature of the invention is a crystallizing heat treatment which consists of a plurality of heating and cooling cycles. Instead of one continuous heat treatment of specified time to produce a crystallized glass body, the present invention contemplates a series of interrupted heat treatments of short duration. During each interruption the glass is cooled, and then reheated. Thus, the present heat treatment will provide a total amount of time at the crystallizing temperature comparable to that of a prior single-cycle treatment. However, this time will be subdivided by cooling interruptions to provide several short applications of heat (pulses), rather than one long continuous application.

For example, the schedule for ceramming a particular crystallizable glass fiber is 21 seconds at 1250° C. In accordance with the present invention, the fiber might be exposed to seven separate heat treatments of three seconds each at the same temperature with cooling intervals intermediate each pair of successive exposures.

The invention is based on my discovery that such an interrupted (pulsed) type of crystallizing heat treatment produces a crystal phase of finer grain size, that is, smaller size crystals, than the comparable continuous heat treatment of equal total time and temperature. The finer grain size is manifested by a greater resiliency in the crystallized glass body and/or a degree of transparency. I have also observed, by way of powder X-ray traces, that the degree of crystallinity in the pulsed type process may be about the same or somewhat greater.

While I do not wish to be bound by any theory, it is my belief that the observed effects result from the development of more nuclei, and hence less crystallization per nucleus. That is, I believe that each time the glass fiber is cooled crystallization stops, or at least is greatly slowed down, while more nuclei tend to grow within the glass. The net effect then is to produce more nuclei on which crystals can grow, and, hence, less crystal growth per nucleus. However, since the total heat treating time is the same in each case, the total amount of crystallization remains the same, or may even be greater in the pulse treatment due to more crystallization on the greater number of nuclei formed. The important factor, however, is the finer grain size achieved in the crystal phase in an equivalent time of heat treatment.

It is contemplated that the high end of each heating cycle will be within the temperature range in which nucleated glass crystallization takes place. Likewise, it is contemplated that the lower end of the cycle, in terms of temperature, will be below this crystallization range, and generally in the range where nucleation occurs. For example, a lithium aluminosilicate glass may contain titania, or a noble metal, such as platinum, ruthenium, or palladium, as a nucleating agent. Small particles of the nucleating agent will separate within one temperature range to act as nuclei upon which a lithium aluminosilicate crystal phase, which may be beta-eucryptite, beta-quartz, or beta-spodumene, will separate as the glass is heated to a higher temperature within what is commonly known as the crystallization range of the glass.

It will be appreciated that the temperature ranges just referred to frequently are not sharply defined. Further, it is essentially impossible to measure the temperature at any given time in a fiber for example. Therefore, within the dimensional ranges of the present invention, it is assumed that temperature change occurs essentially uniformly throughout the body, occurs essentially instantaneously, and corresponds essentially to the temperature of the heating zone in which the treatment takes place.

Neither the number nor uniformity of the cycles in a particular heat treatment, nor the length of the individual cycle, is particularly critical with respect to the invention. As a matter of convenience, a heat treatment will normally consist of several uniform cycles of about 2-5 seconds each. For most purposes, a total heat treating time up to a minute or so is contemplated, but an even longer time of treatment up to about ten minutes may be employed to advantage in some instances. The degree of crystallinity will normally increase, at least to some extent, with the total crystallization time. However, the distinct advantage of compatibility with a continuous operation becomes more difficult to achieve with longer time. Thus, where the crystallization heat treatment is incorporated into another continuous operation, such as the drawing of fibers, a high temperature, rapid ceramming schedule of less than a minute will normally be most convenient.

The pulse heat treatment of the present invention may, in a simple form, be achieved manually. Thus, a number of fibers may be deposited on a suitable support with means to repeatedly move the support into and out of a heat treating furnace. For example, the fibers may be layed in grooves in a refractory support sheet resting in front of the opening for the heat treatment furnace. The furnace will be maintained at a suitable crystallization temperature, e.g., 1250° C. The sheet is then retractably pushed into the oven for a few second interval, removed, reinserted for a second interval, and this cycle repeated, for example, several times.

In order to achieve maximum benefits from the invention, however, it is usually desirable to automate the cycling heat treatment and to incorporate it into a continuous drawing or coating operation. For this purpose, a split laser beam is a particularly convenient source of heat.

SPECIFIC EMBODIMENTS

The invention is further illustrated in FIGS. 1 and 2, in each of which a split laser beam is shown schematically as the heat source. The heat source is not further described, since such heat sources are readily available commercially and their function and operation are well understood.

FIG. 1 illustrates the present cyclic ceramming step as applied to a conventional arrangement for continuously drawing fibers. A suitable glass melt is provided in a REFRACTORY BUSHING adapted to multiple fiber drawing. A suitable glass is one that is capable of being drawn into glass fibers and thereafter converted to the glass-ceramic state by thermal treatment. Many different cerammable glasses are known in the glass art. Also, the viscosity and other glass characteristics best adapted to fiber drawing are well recognized in the art of glass fiber production. Among glasses of particular interest are the basalt type glasses, disclosed in previously mentioned patents, and lithium aluminosilicate glasses which provide a beta-quartz or beta-eucryptite crystal phase when heat treated.

The REFRACTORY BUSHING is provided with a plurality of outlets from which molten glass exudes and glass fibers 10 are continuously drawn as shown in the drawing. Typically, a plurality of glass fibers is drawn from a bushing and collected by suitable means for winding on a drum D or other suitable receiving means for either further use or storage.

As schematically shown in FIG. 1, the heat treatment of the present invention is applied to fibers 10 after they leave the bushing, and before they are gathered on drum D for storage. Thus, a split LASER BEAM is generated to produce, in the present instance, four separate and distinct beams through which the fibers pass as they are drawn. As fibers 10 enter each LASER BEAM, they are reheated to the desired temperature for internal crystallization (ceramming). Thereafter, as they leave the beam, they inherently cool before passing into the next beam. Thus, in an arrangement such as illustrated in FIG. 1, a laser beam is split into four separate beams which provide four separate reheating and cooling cycles for the fibers as they are drawn.

Those familiar with the operation of lasers will readily appreciate that a laser beam may be split into a greater or lesser number of beams as desired, or a plurality of sources may be used to provide the desired number of beams. It will also be appreciated that the rate of fiber draw may be varied in order to adjust the length of time the fiber is reheated in each thermal cycle.

FIG. 2 illustrates, also schematically, the formation, in accordance with the invention, of an optical waveguide 30 having a glass-ceramic protective and strengthening coating 34 as shown in FIG. 3. A composite glass blank 20 consisting of a core portion and a cladding layer is heated to a suitable temperature, by conventional heating means 22, for the drawing of a filament 32 of desired diameter from the rod. Filament 32 is then drawn through a bath of glass 36 which forms an outer coating layer 34 several microns in thickness on the filament 32. The glass coated filament thus formed is then drawn through the several laser beams 24 generated by splitting the beam from the heat source labelled LASER.

In the same manner as the fibers of FIG. 1, the filament coating glass is reheated in each laser beam to a temperature at which internal crystallization occurs in the coating glass, that is, the glass cerams. Intermediate each beam, the glass cools below the crystallization temperature and then is reheated as it enters the next beam. While four beams are shown here, as in FIG. 1, it will again be appreciated that this number may be increased or decreased in known manner for any particular application.

It will be appreciated, of course, that the waveguide filament 32, that is, the glass filament, will be of such composition that it will remain unchanged, that is will not undergo crystallization or other change during the heat treatment being applied to ceram the coating glass. In accordance with conventional practice, waveguide 30, produced in the above operation, may be given a protective plastic coating and then wound on a drum or spool D prior to further processing or storage as desired.

FIG. 3 is an end view in perspective of the composite optical waveguide 30 produced by the procedure described above in conjunction with FIG. 2. Thus, waveguide 30 is a combination of a glass waveguide member 32 and a glass-ceramic protective and strengthening outer coating 34. The latter is initially applied as a glass and then converted to the glass-ceramic state by a procedure as described above. It will, of course, be appreciated that the dimensions shown in FIG. 3 are exaggerated for illustrative purposes.

The invention is further described in terms of specific products produced in accordance with the invention as compared to corresponding products produced in conventional manner.

A tholeiitic basalt, found in the vicinity of Westfield, Mass. has the following approximate analysis in weight percent.

| $SiO_2$ | 52.0 | CaO | 9.3 |
|---|---|---|---|
| $TiO_2$ | 1.0 | $Na_2O$ | 3.2 |
| $Al_2O_3$ | 14.1 | $K_2O$ | 1.2 |
| MgO | 6.4 | $Fe_2O_3$ | 12.8 |

Three batches were prepared for melting using this basalt as a basic ingredient. Table I sets forth, in parts by weight on an oxide basis, the compositions of the batches melted.

TABLE I

|  | 1 | 2 | 3 |
|---|---|---|---|
| Basalt | 100 | 100 | 100 |
| $ZrO_2$ | — | 2.5 | 3.0 |
| $TiO_2$ | — | — | 5.0 |

Each batch, plus a few percent of ammonium nitrate to create a mild oxidizing condition, was crushed to pass through a No. 50 U.S. Standard Sieve (297 microns) and deposited in a platinum crucible. The crucible was placed in a gasfired furnace operating in the range of 1500°–1600° C. and held overnight to complete melting. The crucible was removed and glass fibers having an average diameter of 125 microns were drawn to provide a stock of such fibers from each melt.

The three stocks of basalt glass fibers thus obtained were then cerammed by a variety of different pulsed (intermittent) or multi-cycle heat treatments in accordance with the present invention, each heat treatment differing as to total time or temperature. Each heat treatment consisted of supporting the fibers on a retractable insertion plate in front of a furnace operating at the selected treating temperature. The plate was moved into the furnace, held there five seconds, moved out, and quickly returned to the furnace. This cycle was repeated until the fibers had been heat treated at crystallization temperature for a selected total time. For example, if the selected time was 60 seconds, then the treatment consisted of twelve (12) individual heat treatments of five (5) seconds each.

Table II summarizes the various heat treatment schedules for each set of fibers and the mixed crystal phases observed in each case. The heat treatment is given in terms of furnace temperature in ° C. and total time in the furnace at such temperature, it being appreciated that such total time consisted of a plurality of five second individual times.

TABLE II

| Schedule | | | | |
|---|---|---|---|---|
| Time (sec.) | Temp. (°C.) | 1 | 2 | 3 |
| 30 | 1000 | — | — | Mg + A |
| 120 | 1000 | Mg + A | Mg + A | — |
| 240 | 1000 | Mg + A | — | — |
| 240 | 950 | Mg + A | — | — |
| 540 | 900 | — | Mg + A | — |

Mg = Magnetite
A = Augite

It will be appreciated that, at lower temperatures and shorter times, only a magnetite crystal phase will develop in these relatively large fibers, whereas both phases may develop in smaller, conventional size fibers.

Fibers selected from each set were subjected to powder X-ray trace examination to determine crystallinity characteristics, while crystal size was determined in a qualitative manner from the relative resiliency of comparable size fibers. In general, the fibers of the present invention, that is, the cycle-treated fibers described above, showed a slightly higher degree of crystallinity, but were substantially more resilient than comparable fibers having a single treatment of equivalent time. The greater resilience indicated a smaller grain size.

The multi-cycle ceramming heat treatment was further studied with respect to two glasses of the lithia alumino-silicate type which produce a beta-eucryptite crystal phase when cerammed. These glasses are particularly useful as outer coatings for a glass-ceramic coated optical waveguide as disclosed in my companion application.

The glass compositions, in approximate weight percent on an oxide basis as calculated from the glass batch, are:

|  | A | B |
|---|---|---|
| $SiO_2$ | 52.2 | 50.0 |
| $Al_2O_3$ | 32.9 | 35.1 |
| $Li_2O$ | 11.9 | 11.9 |
| MgO | 3.0 | — |
| CaO | — | 3.0 |
| Pt | 0.06 | 0.06 |

Glass batches, based on these compositions, were prepared in conventional manner and melted overnight in platinum crucibles at 1600° C. Glass cane were drawn from each melt, the cane from the melt of composition A being about 6 mils (150 microns) in diameter, and that from composition B being about 9 mils (225 microns) diameter.

Cane from each lot were subjected to a multi-cycle ceramming heat treatment in the manner previously described except that a single temperature was used. Thus, in each treatment, fibers were supported on a retractable insertion plate in front of a furnace operating at 1250° C. The plate was moved into the furnace, held two (2) seconds, moved out, and then quickly returned for another two second exposure. This cycle was repeated as necessary to provide the selected total ceramming time. Thus, a ten (10) second ceramming schedule required five cycles or insertions in the furnace.

It was determined by power X-ray traces that a beta-eucryptite crystal phase had developed in each fiber tested. The visual appearance of the cerammed fibers from each schedule is shown below with reference to the respective composition.

| Schedule | | | |
|---|---|---|---|
| Time (sec.) | Temp. (°C.) | A | B |
| 2 | 1250 | Transparent | Transparent |
| 6 | 1250 | " | " |
| 10 | 1250 | Slight haze | Slight haze |
| 20 | 1250 | " | " |

The transparent condition indicated a crystal size below 7000 Å, although the haze suggested some crystals about that size. In contrast, fibers of each melt, when given a single five (5) second heat treatment at 1250° C., were opaque white. This indicated a crystal size substantially greater than the transparent limit of 7000 Å.

I claim:

1. In a method for converting a glass body having at least one dimension less than about 250 microns to a glass-ceramic body having a fine-grained polycrystalline phase generally consisting in the steps of:
   (a) melting a glass-forming batch of a desired composition;
   (b) simultaneously cooling said melt to a temperature at least within the transformation range thereof and shaping a glass body therefrom; and then
   (c) heat treating said glass body within a range of temperatures for a time sufficient to cause crystallization in situ of a fine-grained polycrystalline phase therein;
   the improvement which consists in said heat treatment of step (c) consisting of a plurality of heating and cooling cycles wherein each cycle consists of heating said body to a temperature within said glass crystallization range and thereafter cooling said body to a temperature below that range.

2. The method of claim 1 wherein the time and temperature of heating and the time and temperature of cooling of said cycles are uniform.

3. The method of claim 1 wherein the total time of said heat treatment of step (c) does not exceed ten minutes.

4. The method of claim 1 wherein the glass body is a glass fiber.

5. A method for producing a glass-ceramic body having at least one dimension less than about 250 microns and containing a fine-grained polycrystalline phase which consists in the steps of:
   (a) melting a glass-forming batch of a desired composition;
   (b) simultaneously cooling said melt to a temperature at least within the transformation range thereof and shaping a glass body therefrom; and thereafter
   (c) intermittently heating and cooling said glass body by subjecting said glass body to a plurality of heating and cooling cycles, each cycle consisting of heating said body to a temperature within a range wherein crystallization in situ takes place and then cooling said body to a temperature below that range, for a time sufficient to cause crystallization in situ of fine-grained polycrystalline phase therein.

6. A method according to claim 5 wherein a laser beam comprises the source of heating and said glass body is passed through several successively-spaced laser beams thereby subjecting said glass body to a plurality of heating and cooling cycles.

7. The method of claim 5 wherein the glass body is a fiber.

* * * * *